(12) United States Patent
Keen

(10) Patent No.: US 10,320,175 B2
(45) Date of Patent: Jun. 11, 2019

(54) MECHANICAL LINK

(71) Applicant: ULTRA ELECTRONICS LIMITED, Middlesex (GB)

(72) Inventor: Phil Keen, Middlesex (GB)

(73) Assignee: ULTRA ELECTRONICS LIMITED, Middlesex (GB)

( * ) Notice: Subject to any disclaimer, the term of this patent is extended or adjusted under 35 U.S.C. 154(b) by 0 days.

(21) Appl. No.: 15/697,195

(22) Filed: Sep. 6, 2017

(65) Prior Publication Data

US 2018/0069386 A1 Mar. 8, 2018

(30) Foreign Application Priority Data

Sep. 7, 2016 (GB) .................................. 1615208.4

(51) Int. Cl.
*H02G 11/00* (2006.01)

(52) U.S. Cl.
CPC .................................. *H02G 11/00* (2013.01)

(58) Field of Classification Search
CPC .... H02G 3/0443; H02G 3/045; H02G 3/0633; H02G 3/0658; H02G 3/0475; H02G 11/00; H02G 11/003; H02G 11/006; H01B 11/1847; H01B 17/58; F16D 3/72; E05D 11/0081; H01R 35/025; H01R 13/623; F16L 11/18; H04M 1/15
USPC ........ 174/86, 99 R, 21 JC, 21 C, 21 JR, 542, 174/108, 29, 131 R; 439/13, 31, 447, 439/448, 729; 59/78.1
See application file for complete search history.

(56) References Cited

U.S. PATENT DOCUMENTS

| | | | | |
|---|---|---|---|---|
| 1,822,624 | A * | 9/1931 | Hoeftmann | H01B 7/14 174/136 |
| 2,847,499 | A * | 8/1958 | Peterson | H01B 11/1808 174/107 |
| 2,891,501 | A * | 6/1959 | Rather | B63B 21/663 59/78.1 |
| 2,966,644 | A * | 12/1960 | Hafner | H01B 7/04 174/128.1 |
| 2,972,857 | A * | 2/1961 | Bodman | B66C 13/12 59/78.1 |

(Continued)

FOREIGN PATENT DOCUMENTS

| | | |
|---|---|---|
| CN | 101552448 A | 10/2009 |
| GB | 1437956 A | 6/1976 |

(Continued)

OTHER PUBLICATIONS

UKIPO Search Report dated Feb. 21, 2017 for application No. GB1615208.4.

*Primary Examiner* — Roshin K Varghese
(74) *Attorney, Agent, or Firm* — One LLP; Jonathan Jaech

(57) ABSTRACT

A mechanical link includes a carrier for supporting a conductor within a mechanical link. The mechanical link may include a first arm and a second arm, the second arm being arranged for movement with respect to the first arm, and a flexible helical carrier for supporting a conductor, wherein the flexible helical carrier is received within the first and second arms. The carrier may be, or may include a generally helical member of a flexible material, the generally helical member comprising a continuous support portion having on both sides thereof upstanding wall portions.

13 Claims, 4 Drawing Sheets

(56) References Cited

U.S. PATENT DOCUMENTS

| | | | | |
|---|---|---|---|---|
| 3,227,800 A * | 1/1966 | Bondon | ............ | H01B 11/1847 |
| | | | | 174/29 |
| 3,748,373 A * | 7/1973 | Remy | ................... | H01B 7/10 |
| | | | | 174/115 |
| 4,230,389 A * | 10/1980 | Kotski | ................... | H01R 13/28 |
| | | | | 174/78 |
| 5,191,292 A * | 3/1993 | Klotz | ................... | G01M 3/165 |
| | | | | 174/27 |
| 5,405,073 A * | 4/1995 | Porter | ................ | A61B 17/072 |
| | | | | 227/175.1 |
| 5,995,373 A | 11/1999 | Nagai | | |
| 8,389,901 B1 * | 3/2013 | Gelmetti | .............. | B23K 9/1336 |
| | | | | 219/136 |
| 2008/0035800 A1 | 2/2008 | Yamamoto | | |
| 2008/0234056 A1* | 9/2008 | Grawenhof | ............... | F16D 3/38 |
| | | | | 464/135 |
| 2011/0024151 A1* | 2/2011 | Eshima | ............... | H01B 7/1895 |
| | | | | 174/24 |
| 2011/0100679 A1 | 5/2011 | Biggadike | | |
| 2014/0042280 A1* | 2/2014 | Takeuchi | ............ | H02G 3/0475 |
| | | | | 248/49 |

FOREIGN PATENT DOCUMENTS

| | | |
|---|---|---|
| GB | 2129893 A | 5/1984 |
| GB | 2170567 A | 8/1986 |

\* cited by examiner

MECHANICAL LINK

CROSS-REFERENCE TO RELATED APPLICATION

This application claims priority pursuant to 35 U.S.C. § 119 to Great Britain application Serial No. GB1615208.4 filed Sep. 7, 2016, which is hereby incorporated by reference, in its entirety.

TECHNICAL FIELD

The present application relates to a mechanical link for guiding and protecting a flexible member such as a conductor, cable, hose or the like.

BACKGROUND

There are numerous applications in which it is necessary to guide a flexible member such as an electrical conductor or cable, hydraulic hose or the like between two structures, where one structure is moveable relative to the other. For example, in the aerospace industry it is a common requirement for an electrical cable to provide power to components on moveable control surfaces, whilst in the automotive industry electrical conductors are commonly required to provide power to components in doors, wing mirrors and the like. In all of these applications the conductor must be able to withstand repeated movement of the structure to which it is connected without damage, whilst at the same time minimizing the amount of conductor used, to minimize weight and cost.

Solutions have been developed which house conductors within moveable joints, thereby accommodating the required range of movement whilst also protecting the conductor from damage from objects outside the joint. However, many of these solutions are bulky and complicated. Accordingly, a need exists for a compact and simple mechanism for guiding and protecting flexible members such as conductors.

SUMMARY

According to a first aspect of the present disclosure there is provided a mechanical link comprising: a first arm and a second arm, the second arm being arranged for movement with respect to the first arm; and a flexible helical carrier for supporting a conductor, wherein the flexible helical carrier is received within the first and second arms.

The mechanical link of the first aspect provides a robust yet compact and lightweight solution to the problem of guiding and protecting flexible conductors over and around moveable joints.

The flexible helical carrier may be of an elastomeric material.

The elastomeric material may comprise neoprene, for example.

The flexible helical carrier may comprise a continuous support portion for receiving the conductor, the continuous support portion having on both sides thereof upstanding wall portions for retaining the conductor in position when the conductor is received on the central support portion.

The second arm may be arranged for pivotal movement with respect to the first arm about two mutually orthogonal axes.

The mutually orthogonal axes may be offset from one another.

The first arm may comprise a first arm end received in a first housing portion, the second arm may comprise a second arm end received in a second housing portion, and the flexible helical carrier may be attached at a first end thereof to the first arm end and at a second end thereof to the second arm end.

According to a second aspect of the disclosure there is provided a carrier for supporting a conductor in a mechanical link, the carrier comprising a generally helical member of a flexible material, the generally helical member comprising a continuous support portion having on both sides thereof upstanding wall portions.

The flexible material may comprise an elastomeric material.

The elastomeric material may comprise neoprene, for example.

BRIEF DESCRIPTION OF THE DRAWINGS

Embodiments of the inventive concepts disclosed herein will now be described, strictly by way of example only, with reference to the accompanying drawings, of which.

DESCRIPTION OF THE EMBODIMENTS

Figure 1:
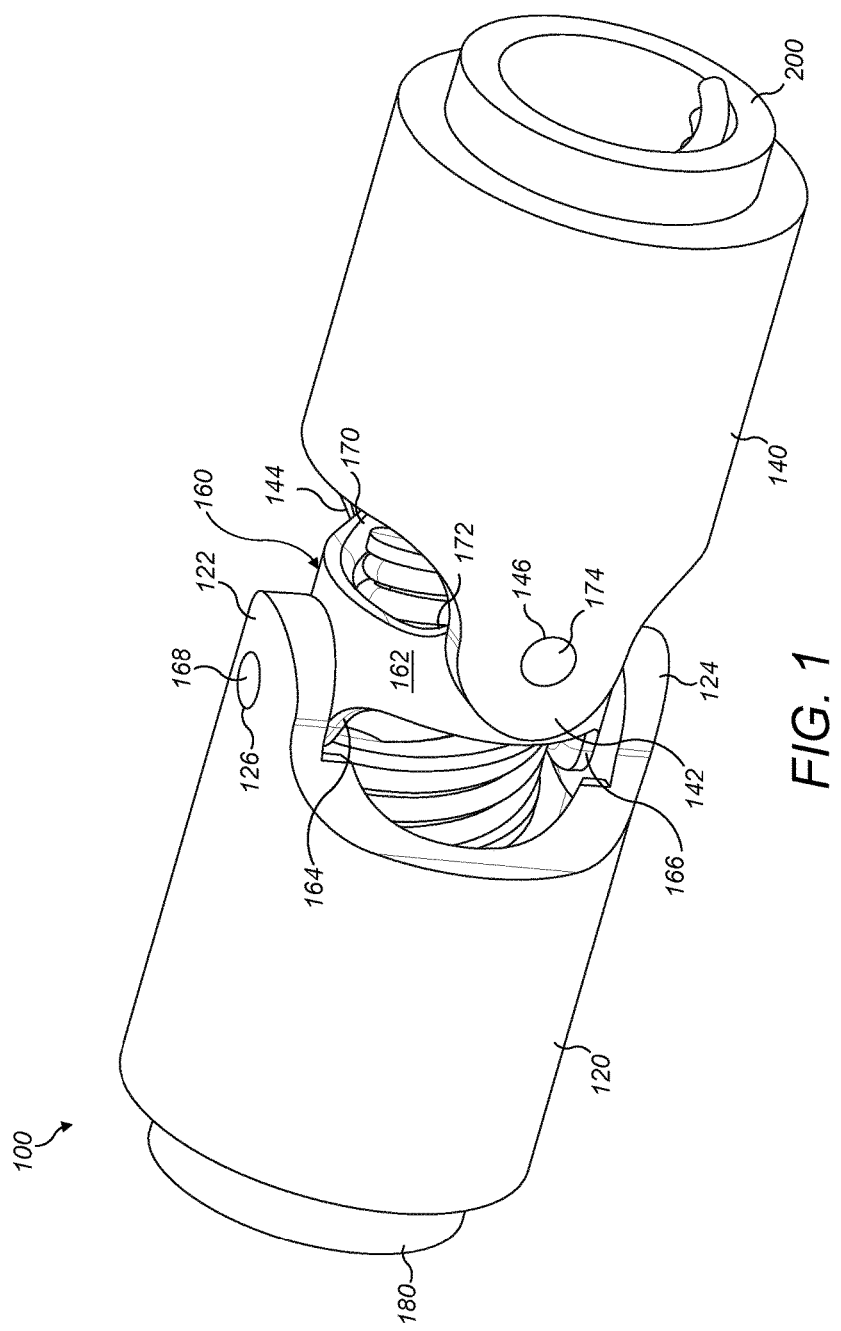
FIG. 1 is a schematic perspective representation of a mechanical link.

Referring first to FIG. 1, a mechanical link is shown generally at 100. In the example described below and illustrated in the accompanying Figures the mechanical link 100 guides and protects a set of flexible electrical conductors, but it will be appreciated by those skilled in the art that the principles described herein can be applied to other types of flexible members, including, for example, cables, pneumatic and hydraulic hoses, fiber optic cables and the like.

The mechanical link 100 comprises an outer housing including a first housing member 120, a second housing member 140 and an intermediate housing member 160 which connects the first housing member 120 to the second housing member 140, such that the second housing member 140 is arranged for pivotal movement with respect to the first housing member 120. Disposed within the first housing member 120 is a generally hollow first arm end 180, and disposed within the second housing member 140 is a generally hollow second arm end 200. The first housing member 120 and the first arm end 180 together constitute a first arm of the mechanical link 100, whilst the second housing member 140 and the second arm end 200 together constitute a second arm of the mechanical link 200.

Figure 2:
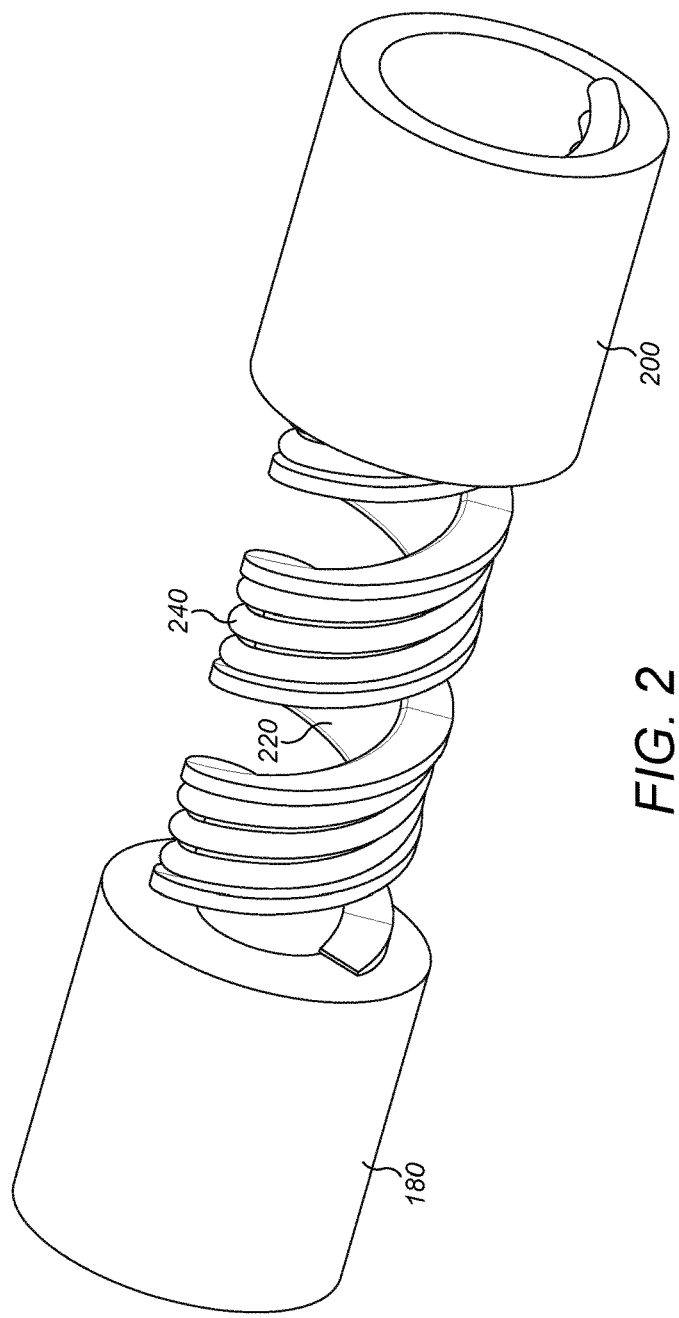
FIG. 2 is a schematic perspective representation of the mechanical link of FIG. 1 with an outer housing removed.

As can be seen most clearly in FIG. 2, a carrier 220 is attached at a first end thereof to the first arm end 180. The carrier 220 is attached at a second end thereof to the second arm end 200. The carrier 220 supports one or more conductors or cables 240 which, in the illustrated example, is a set of three spaced-apart electrical conductors arranged in parallel in the open channel of the carrier. When the mechanical link 100 is fully assembled, the carrier 220 and the conductor(s) 240 that it supports are received within and protected by the first and second housing members 120, 140, and pass through the intermediate housing member 160. In an embodiment, the conductors or cables may be wound around and in the open channel of the carrier under slight tension holding them against the carrier without deforming the carrier's uniform helical shape. In an alternative embodiment, the one or more conductors or cables rest in the open groove of the carrier without being tensioned.

The carrier 220 is generally helical in shape, and is made of a flexible material, such as, for example, an elastomeric material. Neoprene is a particularly suitable material for the flexible helical carrier 220, because of its elastomeric properties and its resistance to chemicals, but it will be appreciated that any flexible material which meets the requirements of the particular application of the mechanical link 100 can be used for the flexible helical carrier 220.

Figure 3:
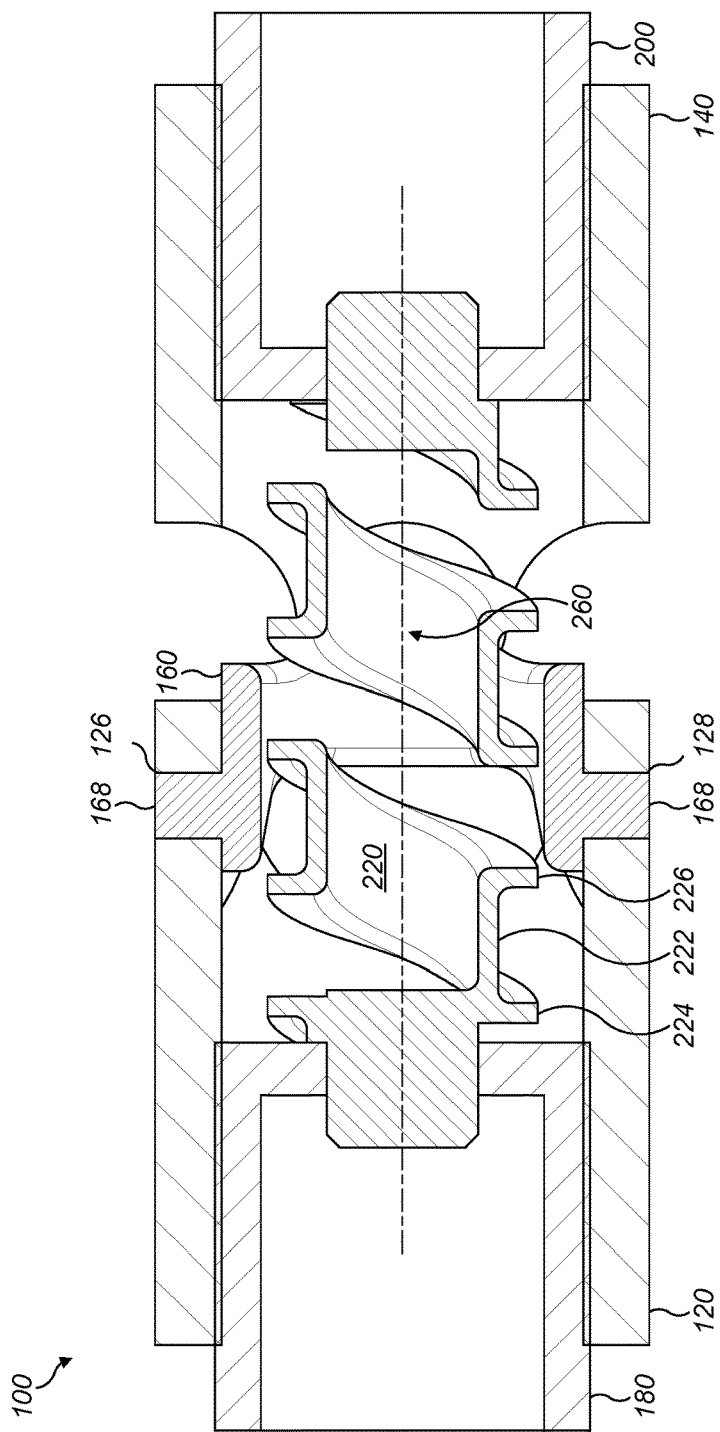
FIG. 3 is a schematic cross-sectional view of the mechanical link of FIGS. 1 and 2, showing first and second arms in an axially aligned condition.
Figure 4:
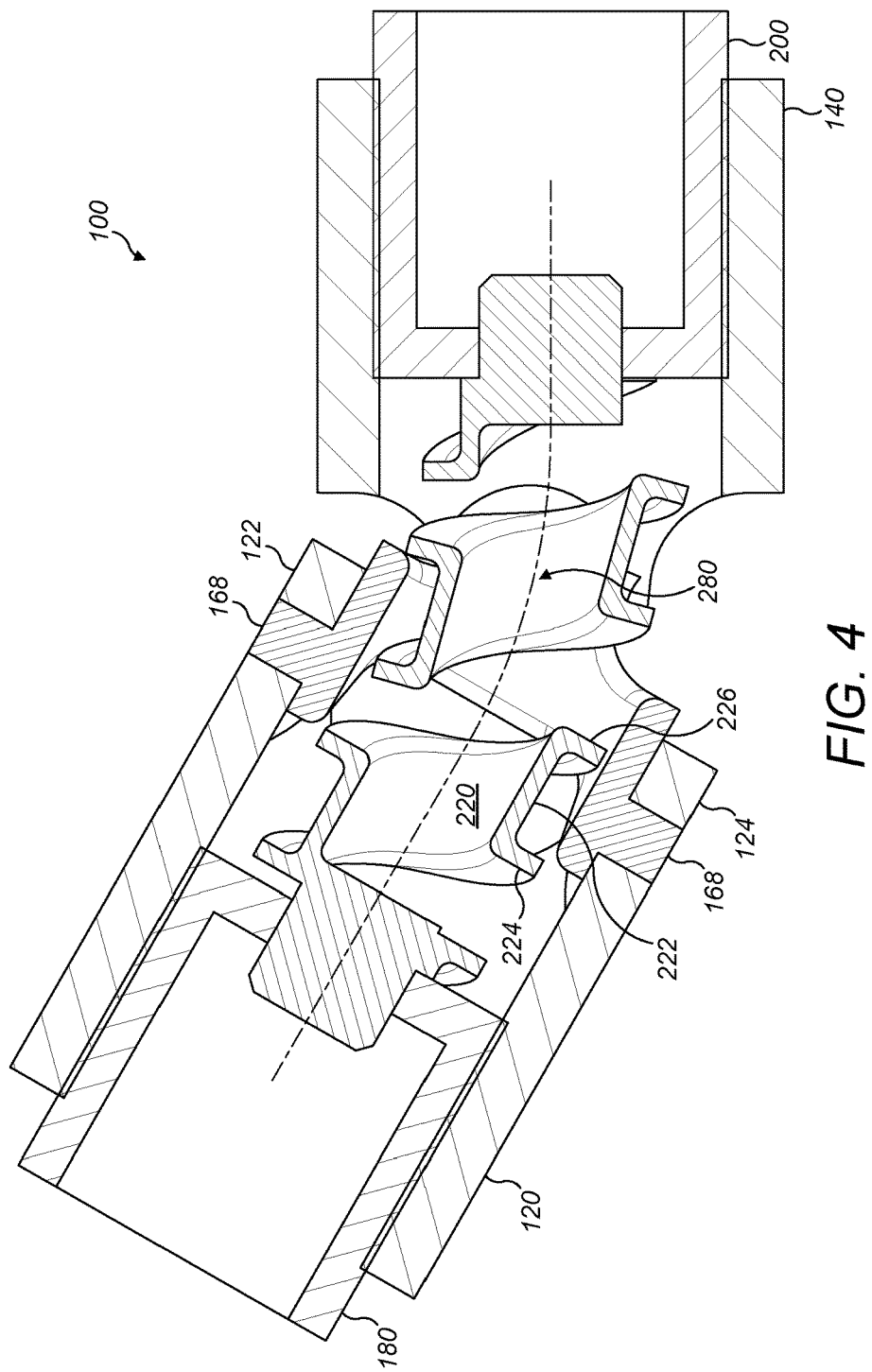
FIG. 4 is a further schematic cross-sectional view of the mechanical link of FIGS. 1 and 2, in a bent configuration in which the first arm is angled with respect to the second arm.

As shown in the cross-sectional representations of FIGS. 3 and 4, the flexible helical carrier 220 is configured with a continuous central support portion 222 which is flanked on both sides by upstanding wall portions 224, 226, which serve to retain the conductor(s) 240 in position when the conductor(s) 240 are received on the central support portion 222, by preventing the conductor(s) 240 from slipping off the edge of the continuous central support portion 222. The continuous central support 220 and upstanding wall portions 224 form an open helical channel.

Returning to FIG. 1, it will be noted that in the illustrated example the first, second and intermediate housing members 120, 140, 160 are configured to form a universal joint, which permits pivotal movement of the first housing member 120 with respect to the second housing member 140 about two mutually orthogonal axes.

The first housing member 120 is formed as a hollow cylinder. A first lug 122 extends outwardly of a first end of the first housing member 120, and a second lug 124 extends outwardly of the first end of the first housing member 120. The second lug 124 is positioned opposite the first lug 122, with the first and second lugs 122, 124 being circumferentially spaced approximately 180 degrees apart so as to form a gap between the first and second lugs 122, 124 in which the intermediate housing member 160 can be received. To this end the first lug 122 includes a mounting hole 126 and the second lug includes a mounting hole 128 (FIG. 3; not visible in FIG. 1) for receiving first and second mounting pins of the intermediate housing member 160.

The second housing member 140 is substantially identical to the first housing member, being formed as a hollow cylinder with outwardly extending spaced first and second lugs 142, 144 (second lug 144 barely visible in FIG. 1) between which the intermediate housing member 160 can be received. To this end the first lug 142 includes a mounting hole 146 and the second lug 144 includes a like mounting hole not visible in FIG. 1 for receiving third and fourth mounting pins of the intermediate housing member 160.

The intermediate housing member 160 is formed as a ring 162 (a short hollow cylinder) having first and second lugs 164, 166 extending outwardly of a first side of the ring 162 in a first direction. The first and second lugs 164, 166 are circumferentially spaced apart on the ring 162 by approximately 180 degrees, and each lug 164, 166 is provided with a respective mounting pin 168 which can be received in the mounting holes 126, 128 of the first and second lugs 122, 124 of the first housing member 120.

The intermediate housing member 160 also includes third and fourth lugs 170, 172 (not visible in FIG. 1) which extend outwardly of a second side of the ring 162 in a second direction which is opposite to the first direction. The third and fourth lugs 170, 172 are circumferentially spaced apart on the ring 162 by approximately 180 degrees, and each lug 170, 172 is provided with a respective mounting pin 174 which can be received in the mounting holes of the first and second lugs 142, 144 of the second housing member 120; e.g., in mounting hole 146 and in its opposite hole (not shown) in lug 144.

As can be seen in FIG. 1, the third and fourth lugs 170, 172 are spaced from the first and second lugs 164, 166 by approximately 90 degrees, such that when the first and second housing members 120, 140 are attached to the intermediate housing member 160, the second housing member 140 is rotated through approximately 90 degrees with respect to the first housing member 120.

The configuration of the first and second housing members 120, 140 and the intermediate housing member 160 permits rotation of the first and second housing members 120, 140 about two mutually orthogonal axes: a first axis which passes through the centers of mounting holes 126, 128 of the first housing member 120 and a second axis which passes through the centers of the mounting holes 146 and its opposite hole (not shown) of the second housing member 140. As can be seen from FIG. 1, because the first and second lugs 164, 166 of the intermediate housing member 160 extend in an opposite direction to its third and fourth lugs 170, 172, these axes are radially offset with respect to each other around the ring 160. This ensures that there is a clear path within the mechanical link 100 for the flexible helical carrier 220 as the link 100 transitions through a range of angles about the first and second axes.

The flexible helical carrier 220 accommodates this rotation without stressing the conductor(s) it carries, as the flexible helical carrier 220 is able to flex, extend and contract to accommodate rotation of the housing members 120, 140, as will now be explained with reference to FIGS. 3 and 4.

FIG. 3 is a schematic cross-sectional representation of the mechanical link 100 in a generally straight configuration. As can be seen, in the straight configuration illustrated that flexible helical carrier 220 is also generally straight, and has a first length, indicated by the chain-dashed line 260, which may be, for example, around 50 mm. The flexible helical carrier 220 as configured in the Figures illustrates a means for supporting a conductor within opposing arms of a mechanical link.

FIG. 4 is a schematic cross-sectional representation of the mechanical link 100 in a bent configuration in which the first housing member 120 is angled with respect to the second housing member 140, by rotation of the second housing member 140 about the second axis. In the illustrated bent configuration (in which the mechanical link 100 has been rotated through 180 degrees about its central axis with respect to the representation of FIG. 3) the flexible helical carrier 220 is bent and has a second length, indicated by the chain-dashed line 280, which is smaller than the first length 260 (e.g. the second length may be around 49.1 mm, as compared to the first length of around 50 mm) due to compression of the flexible helical member 220 as it bends to accommodate the bend in the mechanical link 100.

The exemplary mechanical link 100 described herein and illustrated in the accompanying Figures is configured as a universal joint made up of the first and second housing members 120, 140 and the intermediate member 160. The mechanical link 100 includes a means for movement of a second arm with respect to a first arm including the arrangement of opposing lugs and mounting pins shown in FIG. 1, and means for supporting a conductor within the first and second arms including the flexible helical carrier 220. However, it will be appreciated by those skilled in the art that the principles described in this document are equally applicable to other configurations of mechanical links having first and second arms with the second arm being arranged for movement with respect to the first arm.

For example, a mechanical link may comprise first and second arms that are connected for movement about a single axis. Such single-axis movement may be achieved through the use of an intermediate member connected to both the first and second arms such that the second arm is able to rotate about an axis with respect to the first arm.

Equally, the mechanical link need not have any intermediate member, but instead the first and second arm members may be connected directly to one another for pivotal or other movement (for example translational movement, such as telescopic movement of one arm member with respect to the other) with respect to one another.

Further, the principles described above are equally applicable to mechanical links that permit movement of a second arm about multiple axes with respect to a first arm, for example through the use of a flexible intermediate member such as a corrugated or bellows-like flexible hose, to connect the first arm to the second arm.

The mechanical link described above with reference to the accompanying Figures provides a robust yet compact and lightweight solution to the problem of guiding and protecting flexible conductors over and around moveable joints, which may involve movement about multiple different axes.

The invention claimed is:

1. A mechanical link comprising:
    a first arm and a second arm, the second arm being arranged for movement with respect to the first arm;
    an intermediate housing member interposed between first and second housing members, wherein the first, second and intermediate housing members are configured to form a universal joint; and
    a flexible helical carrier for supporting one of an electrical cable or an optical cable wound around a continuous support portion of the flexible helical carrier, wherein the flexible helical carrier is received within the first and second arms and the first arm comprises a first arm end received in a first housing member, the second arm comprises a second arm end received in a second housing member, and wherein the flexible helical carrier is attached at a first end thereof to the first arm end and at a second end thereof to the second arm end.

2. A mechanical link according to claim 1 wherein the flexible helical carrier is of an elastomeric material.

3. A mechanical link according to claim 2 wherein the elastomeric material comprises neoprene.

4. A mechanical link according to claim 1 wherein the continuous support portion of the flexible helical carrier having on both sides thereof upstanding wall portions for retaining the conductor in position when the conductor is wound on the continuous support portion.

5. A mechanical link according to claim 1 wherein the second arm is arranged for pivotal movement with respect to the first arm about two mutually orthogonal axes.

6. A mechanical link according to claim 5 wherein the mutually orthogonal axes are offset from one another.

7. A mechanical link according to claim 1, wherein the first housing member and the second housing member are formed as hollow cylinders.

8. A mechanical link according to claim 1, wherein the intermediate housing member is formed as a ring.

9. A carrier for supporting a conductor in a mechanical link, the carrier comprising a helical member of a flexible material terminated by ends configured for coupling to a mechanical link, the helical member consisting essentially of a continuous support portion having on both sides thereof upstanding wall portions for supporting one of an electrical cable or an optical cable;
    a first arm and a second arm, the second arm being arranged for movement with respect to the first arm;
    an intermediate housing member interposed between first and second housing members, wherein the first, second and intermediate housing members are configured to form a universal joint;
    wherein the carrier is received within the first and second arms and the first arm comprises a first arm end received in a first housing member, the second arm comprises a second arm end received in a second housing member, and wherein the carrier is attached at a first end thereof to the first arm end and at a second end thereof to the second arm end.

10. A carrier according to claim 9 wherein the flexible material comprises an elastomeric material.

11. A carrier according to claim 10 wherein the elastomeric material comprises neoprene.

12. A carrier according to claim 9, wherein continuous support portion having on both sides thereof the upstanding wall portions forms a helical open channel.

13. The carrier according to claim 12, wherein the helical open channel is configured for holding multiple cables in a parallel arrangement.

* * * * *